Inventor
Harris G. Napier
By Marzall, Johnston, Cook & Root
Attorney

Inventor
Harris G. Napier
By Marzall, Johnston, Cook & Root
Attorneys

United States Patent Office 3,540,994
Patented Nov. 17, 1970

3,540,994
APPARATUS FOR TREATING EMULSIONS
Harris G. Napier, Lindale, Tex., assignor to Howe-Baker Engineers, Inc., Tyler, Tex., a corporation of Texas
Filed Jan. 19, 1968, Ser. No. 699,189
Int. Cl. B01d 13/02; C10g 33/02
U.S. Cl. 204—302                                13 Claims

ABSTRACT OF THE DISCLOSURE

This invention relates to an apparatus and method for the electrical treatment of emulsions of the oil-continuous type, and more specifically to a new apparatus by which the amount of residual dispersed-phase in the treated oil is reduced to a much lower value in smaller equipment than is possible with older known commercial processes.

The invention provides elongated discharge electrodes in an electric oil emulsion treater, which electrodes are irregularly shaped and preferably are polygonal or star-shaped in transverse cross-section and provide a plurality of longitudinal ribs extending substantially radially from the axis of each electrode.

BACKGROUND OF THE INVENTION AND PRIOR ART

It has previously been proposed to treat an oil-continuous emulsion (U.S. Pat. 987,115), by subjecting the emulsion to a high voltage field. The dispersed droplets are coalesced and then gravitationally separated from the oil phase. This process has gained wide commercial acceptance and is widely used to desalt and dehydrate crude oil. This process removes the bulk of the dispersed phase, but it is not possible to reduce the dispersed phase to below about one-tenth of one percent, even when treating easily treated crude oils.

It has also been proposed to treat an oil-continuous emulsion (U.S. Pat. 1,931,725) by subjecting the emulsion to the action of an electric field of greater voltage gradient toward the negative electrode than toward the positive electrode, said field being produced by a unidirectional electric current. The dispersed phase is removed by cataphoresis and collects on one of the electrodes and drains off by gravity. While this process is technically feasible with some emulsions, it has not found commercial acceptance.

It has also been proposed (U.S. Pat. 2,855,356) to treat an oil-continuous emulsion by subjecting it to a unidirectional electrical field in laminar flow between parallel vertical plates. In this system every effort was made to keep the electric field as uniform as possible.

It has been further proposed to treat an oil-continuous emulsion (U.S. Pat. 3,252,884) by subjecting the emulsion, while flowing within a pressure vessel, to an electric field which is highly non-uniform in the vertical and horizontal planes in the lower few inches of the electric field and which is non-uniform in the horizontal plane and uniform in the vertical plane throughout the majority of the electric field; the oil-continuous emulsion flowing vertically through the electric field; controlling the process so that the treated oil contains much less of the dispersed phase than was possible with other commercial processes; and reducing the dispersed phase in the treated oil to a very low value in much smaller equipment than was possible with prior electric treaters.

It is an object of the present invention to provide an improved electrode design for emulsion treaters particularly those of the type disclosed in said U.S. Pat. 3,252,884; which patent is assigned to a common owner.

A further object of the present invention is to create the electric field with an improved, new and novel electrode system which is vertical, economical to build, and can be easily installed in either new or used pressure treatment vessels.

A still further object of the present invention is to provide an improved electrode configuration presenting a particular surface area whereby the desirable non-uniform electrical field characteristics of the treater are greatly enhanced, so that the treated oil will contain an extremely low value of dispersed phase material; resulting in a far better reduction of carry-over (the amount of residual dispersed material remaining in the treated oil) and thus an improved product.

Yet another and more specific object of the present invention is to provide elongated vertical discharge electrodes for utilization in conjunction with planar electrodes in an electric oil emulsion treater; such elongated electrodes having a cross-section transverse to the longitudinal axes thereof which is termed star-shaped in the description of the invention which follows.

Further objects, advantages and benefits of the invention will become evident to those skilled in the art from the following detailed description, taken in conjunction with the accompanying drawings, wherein.

Figure 1:
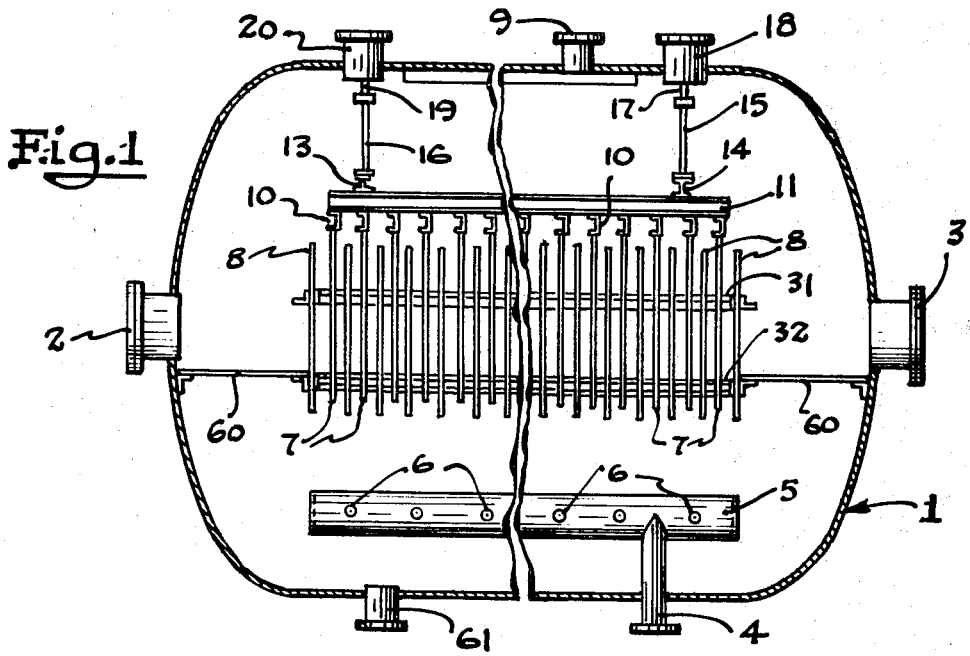
FIG. 1 is a side elevation sectional view of an electric treater apparatus employing the vertical discharge electrode of the invention.

In accordance with the invention a new and improved electric treater for treating oil-continuous emulsions is provided having elongated vertical discharge electrodes of a novel cross-sectional shape. An essential feature of the invention embodies the use of planar electrodes, for example, solid or perforate plates, alternately arranged with respect to rows of non-planar vertical electrodes which are preferably substantially polygonal or star-shaped in cross-section, such as, for example, longitudinally ribbed rods or bars. The non-planar vertical electrodes may be constructed from hollow tube stock, end capped and shaped by drawing or like means to achieve a polygonally cross section. To improve the efficiency of operation the invention also contemplates that the planar electrodes be irregularly shaped such as, for instance, they may be in the form of a corrugated sheet.

The electric treater as a whole preferably comprises a container, a set of electrodes consisting of alternate vertically substantially parallel plate electrodes, rows of vertical electrodes of substantially star-shaped cross section, the plate electrodes being from two to fourteen inches apart, the rod electrodes being substantially equidistant from adjacent plate electrodes, the spacing between the rod electrodes being approximately equal to the distance between such electrodes and the plate electrodes, a source of unidirectional potential, means connecting said source of unidirectional potential to said electrodes, an emulsion inlet header located below said electrodes, an oil outlet header located above said electrodes through which the treated oil is withdrawn, preferably continuously, and means for withdrawing the coalesced discontinuous phase, preferably continuously. In this type of apparatus, the plate electrodes may be perforated, or may be replaced by wire mesh electrodes.

In a typical apparatus of the type described, the housing or container is a cylindrical structure disposed horizontally and provided at the bottom with inlet means for the emulsion to be treated, and separate outlet means for the coalesced discontinuous phase. At the top of the container an outlet means is provided for removing the treated oil. The container is otherwise closed and the treated oil normally fills the container during operation.

The planar electrodes which preferably consist of plates, corrugated plates or wire mesh, are suspended from opposite sides of the container in a vertical position and are spaced apart in a substantially parallel relationship. The rod or bar electrodes are suspended in rows between the plate electrodes and preferably terminate above or below the bottom of the plate electrodes. In a typical construction good results have been obtained by using plate or wire mesh electrodes which are arranged six inches apart and rod electrodes which are substantially three-quarters of an inch measured across their major transverse dimension spaced three inches from center to center in rows equidistant from the plate or wire mesh electrodes. A suitable arrangement of such planar and nonplanar electrodes, for example, consists of twenty-five vertical plate or screen electrodes and twenty-three rows of vertical rod electrodes, each row containing twenty-three rods. In this arrangement, it is preferable to have a vertical distance of about thirty-six inches in which the rods, on the one hand, and the plates or wire mesh on the other, are opposite one another or, in other words, in the same field. As previously indicated, the vertical rods preferably either extend below the plate electrodes or terminate short of the bottoms of the plate electrodes. In this way the lower part of the field is non-uniform, both vertically and horizontally.

The invention is not limited to any specific sizes or lengths or rods employed as vertical non-planar electrodes but, as a practical matter, it is desirable to use rods from twelve to sixty inches long. The planar electrode spacing, as previously indicated, is preferably from two to fourteen inches apart. Since the non-planar electrodes are located substantially equidistant from the planar electrodes, the spacing of the non-planar electrodes from the planar electrodes varies from about one to seven inches.

The unidirectional potential may be infinitely variable up to about 40,000 volts. Excellent results have been obtained by using about 5,000 volts per inch of electrode spacing. A general range is 3,500 volts per inch of electrode spacing to 15,000 or more volts per inch of electrode spacing. In this type of operation the current or amperage is kept at a minimum and preferably does not exceed 85 milliamperes.

In constructing the apparatus it is usually preferable to ground the plates or planar electrodes to the side of a steel container and to insulate the electrical conductors for the nonplanar electrodes from the container. Thus, the rods or non-planar electrodes are connected to a positive source of unidirectional potential and the planar electrodes are negative. While this is a preferred arrangement, it can be reversed.

The ratio of the surface area of the planar electrodes to the non-planar electrodes is subject to variation, but is at least 6:1 and preferably within the range of 4:1 to 1:1. A good operational ratio involves the use of a plate surface area to rod surface area of about 2.5:1.

Where the rods or tubes extend below the plates or other planar electrodes they are preferably rounded at their free ends.

In the apparatus shown in the drawings, the container or vessel 1 is generally cylindrical in structure, as shown in FIG. 1, and is closed at opposite ends by manholes 2 and 3. An inlet pipe or conduit 4 is provided at the bottom of the container 1 to introduce a material which is to be treated. The inlet conduit 4 is connected to a horizontal distributing pipe 5 which is provided with spaced openings 6 on opposite sides thereof adapted to uniformly distribute or spray the material to be treated into the container 1. The electrodes consist of rows of rods 7 substantially equally spaced from vertically extending plates 8, thereby providing vertical passageways between the rods and the places for the material to be treated as this material flows upwardly toward an outlet 9.

The rods 7 are supported in rows by a plurality of channel members 10 constructed of steel or other suitable conducting material. The channel members 10 are bolted, welded or otherwise attached to a pair of cross channel members 11. The cross channel members are in turn welded, bolted or riveted to steel or other electrically conducting channel members 13 and 14, and the latter in turn are supported by tubular or rod-like supporting members 15 and 16. The supporting member 15 is connected to another supporting member 17 which in turn is electrically connected to a unidirectional power supply through an insulator bushing housing 18. The supporting member 16 is connected to another supporting member 19 which in turn is connected to another supporting member 19 which in turn is connected to an insulator bushing supported in a housing 20, as described in detail in U.S. Pat. No. 3,252,884; supra.

Supporting members 17 and 19 are preferably releasably supported, as for example, by a hook-and-eye arrangement (not shown) to facilitate maintenance of the treater assembly, while affording electrical continuity between the rods 7 and the terminal of the unidirectional power source.

One terminal, preferably the positive one, of a source of unidirectional power (not shown) is connected by way of suitable and conventional switch gear including known voltages and current adjusting and regulating means (also not shown), through housing 18 to the member 17 and from member 17 through the supporting member 15 and channel member 14 to the channel members 11 for the vertical rod discharge electrodes. The insulator bushings within the housings 18 and 20 are preferably fabricated from a polymer such as polypropylene or a polymer of tetrafluoroethylene (Teflon). With insulators of this type it is not necessary to inject a non-conducting purge stream around the insulating surfaces to prevent the formation of conductive paths across the surface of the insulators as was previously necessary with older commercial electric treater, thus aiding in effecting a fluid-tight connection to the container 1.

The vertical plate electrodes 8 are supported from the sides of the container 1 by any suitable means, such as for example, angle bars 31 and 32 which are welded or otherwise secured to the far interior wall surface of the container 1. The opposite side of each electrode 8 is similarly suported from angle bars (not shown) which in turn are welded or otherwise secured to the near interior wall surface of the container. Plate electrodes 8 are preferably releasably supported in openings provided in the angle bars to facilitate maintenance of the treater assembly, as by threaded fastening means which assure electrical continuity between the plates 8 and the body of the container 1. The second terminal, preferably the negative one, of the source of unidirectional power is connected to the body of container 1, and thus to the plate electrodes 8 by conventional means (not shown).

Figure 2:
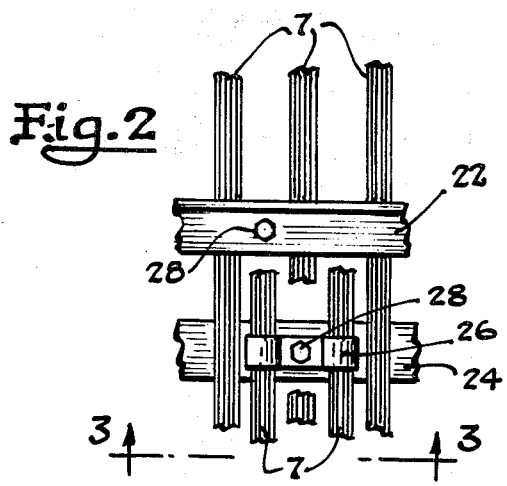
FIG. 2 is a fragmentary enlarged elevational view showing a detail of the vertical discharge electrodes of the FIG. 1 apparatus, and the mounting means therefor.
Figure 3:
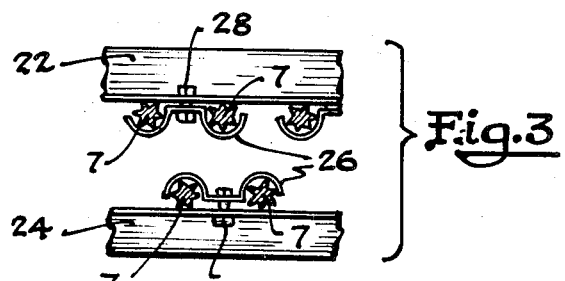
FIG. 3 is a horizontal sectional view taken along the line 3—3 of FIG. 2.

As shown in greater detail in FIG. 2 and FIG. 3, the vertical rod electrodes 7 which may be clamped or threadably secured to and supported by the channel members 10, are maintained in the desired inter-spaced configuration by means of angle bars 22 and 24. Adjacent pairs of the rod electrodes are clamped to the angle bars 22 and 24 by means of the saddle members 26 and bolts 28. As evident in FIG. 3, the concave inner surface of the arms of the saddle members 26 are substantially arcs of a circle, such as may be provided by known hardware items utilized to secure pipe, electrical conduit or similar articles to a planar surface. Rather than the double saddle-shaped clamping members 26 shown, single question mark shaped clamps may be utilized alone or in combination with the double clamps, particularly when there is an odd number of vertical rod electrodes 7 in any row, or in the case when alternate rows of the electrodes are staggered, as illustrated in FIGS. 2 and 3.

Figure 5:
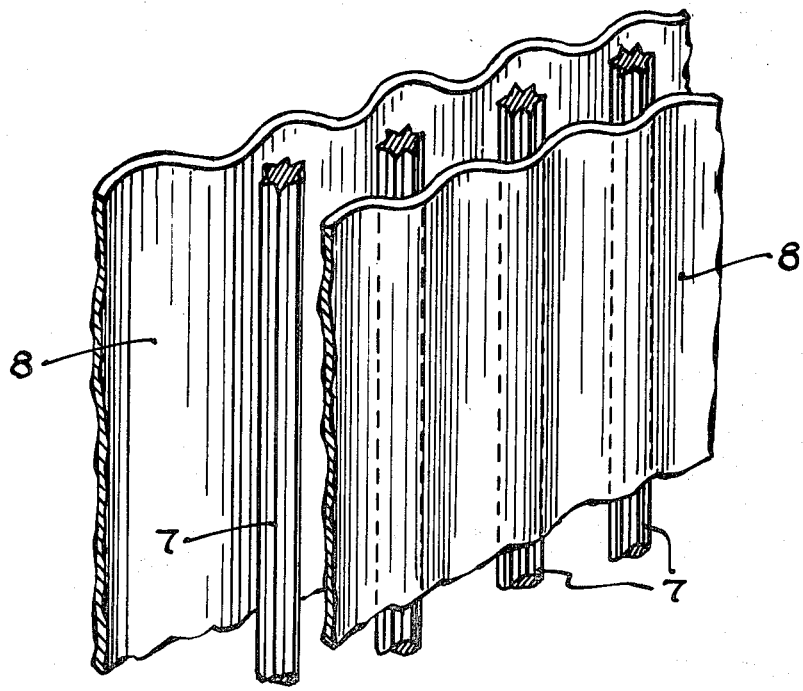
FIG. 5 is a fragmentary plan view showing corrugated planar electrodes in combination with vertically positioned polygonal shaped discharge electrodes.

In order to improve the non-uniformity of the field, the invention also contemplates the use of the arrangement shown to best advantage in FIG. 5 wherein the planar electrode 8 is of a corrugated configuration with the vertical rod electrodes 7 being uniformly positioned parallel there between in spaced apart relationship. As shown in FIG. 5, the vertical rod shaped electrodes are of polygonal cross section. They may be in this form or they may be of conventional cylindrical shape without departing from the scope of the invention.

In order to prevent unwanted field discontinuities and to assure that the lower part of the field is maintained non-uniform, vertically and horizontally for optimum coalescence, in treaters of certain dimensions, it may be preferable to utilize insulating or non-conducting materials for the angle bars 22, 24 and the clamping elements 26, 28.

Figure 4:
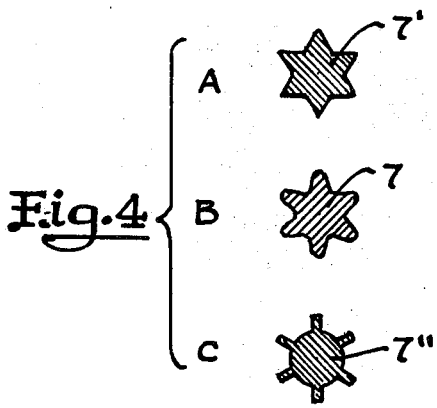
FIG. 4 shows, to a further enlarged scale, cross-sectional views of several embodiments of vertical discharge polygonal shaped electrodes which may be utilized in the apparatus of FIG. 1.

The rod electrodes 7 are polygonal or star-shaped in cross section. FIG. 4 illustrates in transverse section several preferred embodiments of such discharge rod electrode shapes. While the rod sections 7, 7' and 7" each are shown as having six longitudinal ribs, the invention is not limited to any particular number of ribs.

Figure 6:
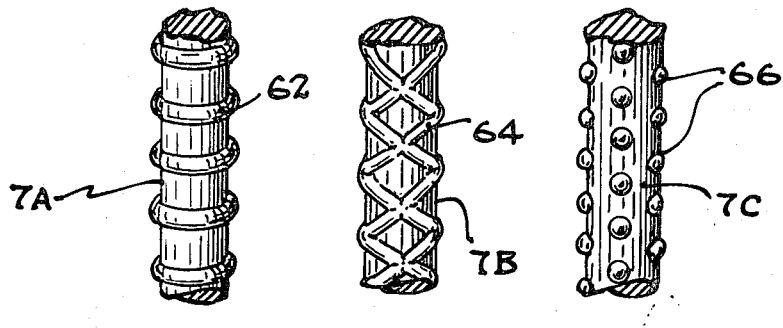
FIG. 6 is a vertical plan view showing alternate structures for the discharge electrodes.

As shown in FIG. 6, the vertical discharge electrode 7 may be formed or shaped by various means to provide additional surface area. Electrode 7A is in the form of a bar having positioned therearound horizontally disposed parallel spaced apart rings which project horizontally from the face of the bar.

In the case of electrode 7B, the outer surface of a cylindrical bar as positioned thereabout knurling 64 to provide additional surface area.

Electrode 7C is so constructed to have positioned thereabout a series of spaced apart nipples 66.

In general, the greater the number of ribs, for example five or more, the greater is the treatment improvement over that provided by the use of cylindrical discharge electrodes known in the prior art. It is believed that the plurality of longitudinal ribs produces an enhanced non-uniformity of the electrical treatment field with a corresponding enhancement of the coalescence of the discontinuous phase.

The star-shaped vertical discharge rods shown in FIG. 4 may be provided by commercially available shapes, or may be fashioned by suitable milling, extrusion or fabrication techniques. For example, FIG. 4B shows a rod 7 having rounded rib edges and the interconnecting valleys, of the type illustrated in FIGS. 2 and 3. Rod 7 may be a commercially available pinion shaft having this cross sectional shape. Other commercial stock shapes may also be utilized for carrying out the invention, as for example, a spline shaft of typically sharply defined rib edges and valleys, similar to the section shown in FIG. 4C. The rod shape 7' may be produced by extrusion or milling operations, while rod shape 7" may be formed by milling a cylindrical rod, or by the attachment of separate individual ribs by any suitable means (not shown), as for example, by welding stub ribs or by splinning longer ribs into the central rod body.

In the apparatus described, suitable valves (not shown) are provided to control the flow through the pipe 4 of the liquid to be treated and the flow through the pipe 9 of the treated liquid. A suitable valve (not shown) is also provided in order to control the flow through pipe 61 of the coalesced liquid from the discontinuous phase at the bottom of the container 1. Ordinarily the discontinuous phase occupies a vertical depth of about twelve to eighteen inches in the bottom of the container.

The invention is useful for treating a wide variety of hydrocarbon oils and extracts and distillates derived therefrom, especially where such oils, extracts and distillates have been chemically refined with an acid or alkali, and which must be removed from the oil in order to improve its quality. Examples of treatments which produce such disperse or discontinuous phases are sulfuric acid treatments, sodium hypochlorite treatments, caustic alkali treatments, treatments with doctor solution and any treatments which introduce an aqueous discontinuous phase into the oil.

The bulk of the dispersed or discontinuous phase is coalesced in the first few inches of the highly non-uniform field at the bottom of the electrodes. The non-uniform field causes rapid random motion of the dispersed particles which promotes a large number of collisions and subsequent coalescence.

A variety of coalescing actions takes place in the bulk of the field.. A great deal of coalescence takes place in situ in the emulsion because of the forces the individual droplets exert on each other in the presence of the electric field.

The non-uniformity of the field in the vertical plane causes the particles to move by cataphoresis to one of the electrodes where they coalesce on the electrodes. Part of the dispersed phase drains from the bottom of the electrodes. Other portions of the dispersed phase are repelled from the electrode at right angles to the flow. These droplets fall lower and lower in the electric field as they move from one electrode to the other. The large number of these particles in rapid motion between the electrodes makes it almost impossible for a dispersed particle to pass through the electric field without colliding with another particle.

When a particle reaches sufficient size to fall by gravity, it selles downward against the upward flowing emulsion and increases in size by coalescence with the dispersed particles in the rising emulsion.

The efficiency of this invention is very dependent upon the optimum voltage being applied. This optimum voltage will vary with the emulsion being treated. As an illustration of the practical operation of the invention, and of the advantages attendant thereto, the following example is given.

EXAMPLE

A light catalytic cracked oil (LCCO), and later a commercial run aviation jet fuel (AJF) compounded of kerosene and gasoline, were mixed with a 25° Bé. aqueous caustic solution at volume percent addition rates for the reagent of 7.5 and 4, respectively, and passed through an electrical treater of the general type previously described containing the star-shaped cross section rod electrodes of the invention (Stage A) at the several treatment temperatures, mixing rates and unidirectional voltage gradients set forth in the table below. Mechanical mixers were utilized for the LCCO, while a mixing valve was used to achieve emulsification of the AJF. Coalescence of the caustic soda solution present in the dispersed phase took place in very short time periods as the emulsion flowed continuously into the treating apparatus and the coalesced caustic soda solution was removed through the outlet 61. The treated oil was removed through the outlet header 9, and was found to contain the residual volume percent caustic soda solution levels indicated in the table.

A comparative test made under identical conditions with the same temperatures, mixing rates and potential gradients in an electrical treater (Stage B) which was the same except that cylindrical cross section rod electrodes of the type described in U.S. Pat. 3,252,884 were substituted for the rows of star-shaped rod electrodes gave treated oil containing up to 600% more caustic soda by volume. Thus the star-shaped rods of the invention gave improvements from 155% (Run 5) to 600% (Run 2) over the results obtained by using apparatus in which the vertical discharge electrodes consisted of non-ribbed smooth cylindrical rods.

TABLE

|  | Run 1 | Run 2 | Run 3 | Run 4 | Run 5 |
|---|---|---|---|---|---|
| Feed: |  |  |  |  |  |
| Stage A | LCCO | LCCO | AJF | AJF | AJF |
| Stage B | LCCO | LCCO | AJF | AJF | AJF |
| Additive: |  |  |  |  |  |
| Stage A, Bé. NaOH | 25° | 25° | 25° | 25° | 25° |
| Stage B, Bé. NaOH | 25° | 25° | 25° | 25° | 25° |
| Additive Rate, vol. percent: |  |  |  |  |  |
| Stage A | 7.5 | 7.5 | 4.0 | 4.0 | 4.0 |
| Stage B | 7.5 | 7.5 | 4.0 | 4.0 | 4.0 |
| Temperature, °F.: |  |  |  |  |  |
| Stage A | 92 | 93 | 84 | 84 | 85 |
| Stage B | 93 | 93 | 84 | 84 | 85 |
| Mixers, r.p.m.: |  |  |  |  |  |
| Stage A | 900 | 900 | ¹10 | ¹15 | ¹20 |
| Stage B | 900 | 900 | ¹10 | ¹15 | ¹20 |
| Voltage, volts/inch: |  |  |  |  |  |
| Stage A | 5,000 | 3,000 | 4,500 | 4,500 | 4,500 |
| Stage B | 5,000 | 3,000 | 4,500 | 4,500 | 4,500 |
| Carryover, vol. percent: |  |  |  |  |  |
| Stage A | .005 | .005 | .001 | .003 | .0045 |
| Stage B | .005 | .030 | .003 | .005 | .0070 |

¹ Denotes pressure drops across pinion rods.
NOTE.—Stage A grids: 6-toothed pinion rods; Stage B grids: cylindricl rods.

No explanation can be offered for this improvement except that the use of rows of rods having the star-shaped cross section provides a unique electrical field due to the arrangement of the planar surfaces of the plate electrodes and the non-planar surfaces of the rows of ribbed rod electrodes. This evidently produces an exceptional non-unity of the field in all directions, and enhances the coalescence of the discontinuous phase of the liquid being treated over that effected by the apparatus using the smooth surfaced rods of the prior art.

The residence time of the liquid to be treated in the apparatus will vary depending upon the type of emulsion, the size of the treating unit, the particular electrical potential employed, and the temperature used. In general, the residence time will vary from five to forty minutes and this is controlled by controlling the flow rate of the liquid introduced into the treating apparatus.

The temperature is usually subject to variation but ordinarily will be within the range of 40° F. to approximately 150° F. and this will vary depending upon the particular emulsion to be treated.

The predetermined electrical potential may be supplied in any convenient manner normally used to produce a direct current. It is generally preferable to provide a direct current by employing a poly-phase system wherein the deviation of the maximum voltage from the average voltage, generally known, as the ripple factor, is reduced so as to effect a reduction in pulsation. However, a single phase system can also be used. A single phase system pulses constantly with the ripple factor being approximately 52%. In a three-phase system the ripple factor is reduced to about 4%. Other forms of unidirectional potential can be employed such as are derived, for example, by superimposing an alternating current on a direct current to produce a pulsating direct current which is unidirectional.

The coalesced discontinuous phase which settles in the bottom of the treating vessel may be removed intermittently or continuously. It is usually preferable to provide a level control (not shown) which operates a valve (not shown) connected to the outlet 61 when the coalesced discontinuous phase reaches a predetermined level.

The invention is especially useful in treating oils in which the dispersed or discontinuous phase does not exceed about 3% by volume of the oil to be treated. Suitable preconditioning of the oils to attain such discontinuous phase levels may be taken prior to treatment in the apparatus of the invention.

In general, however, the invention is useful in treating any oil continuous emulsions or dispersions, some of which can contain as high as 40% by volume of the discontinuous phase.

The invention has been particularly described with respect to electric treaters having vertically disposed parallel planar electrodes in conjunction with rows of longitudinally ribbed non-planar electrodes. It will be understood that the concept of irregular cross-sectioned rod-shaped electrodes has applicability and utility in the design and operation of other types of treaters.

It is common in the electric treating art, particularly the desalting of crude oils, to use a horizontally disposed tank in which are positioned horizontally hung rods or bars in parallel spaced apart relationship.

Illustrative of horizontally positioned bar electrodes are those treaters disclosed in U.S. 2,855,359, U.S. 2,894,895 and U.S. 3,073,776. In treaters of the type described in these patents there is shown at least one set of spaced apart rod-shaped electrodes. In such units, as well as in other electrostatic desalters, alternating rather than direct current is used. In such units the use of irregular shaped electrodes provides substantially improved results.

It is obvious from the invention thus described that it may be practiced with a variety of irregularly shaped electrodes with either the positive or the ground electrode being of irregular shape. In the case of treating devices with a combination of planar and rod shaped electrodes, it is possible to make the planar electrode corrugated and the rod shaped electrodes of either conventional cylindrical or of irregular shape such as a star-shaped electrode.

While the invention is primarily directed to using irregularly shaped rod type electrodes which may be polygonal, ribbed, knurled or otherwise formed to provide irregular surfaces it will be understood that a preferred embodiment is the use of the polygonal shaped electrodes, particularly the star-shaped electrodes.

I claim:

1. An electric treater for treating oil continuous emulsions, said treater comprising a container, a set of spaced, vertically disposed, substantially parallel planar electrodes, rows of irregularly rod shaped non-planar electrodes extending vertically in the spaces between said planar electrodes substantially equidistant from each other and from said planar electrodes, a source of unidirectional potential connected to said electrodes, an inlet for said oil continuous emulsion below said electrodes, an outlet for the treated oil above said electrodes, and means for withdrawing a coalesced discontinuous phase from said container.

2. An electric treater for treating oil continuous emulsions, said treater comprising a container, a set of spaced, vertically disposed, substantially parallel planar electrodes, rows of non-planar electrodes extending vertically in the spaces between said planar electrodes substantially equidistant from each other and from said planar electrodes, a source of unidirectional potential connected to said electrodes, an inlet for said oil continuous emulsion below said electrodes, an outlet for the treated oil above said electrodes, and means for withdrawing a coalesced discontinuous phase from said container; said vertically extending non-planar electrodes being substantially polygonal in transverse cross section.

3. An electric treater as claimed in claim 2, in which said vertical electrodes are of star-shaped cross section.

4. An electric treater as claimed in claim 2, in which said vertical electrodes are multi-toothed pinion shafts.

5. An electric treater as claimed in claim 2 where said electrodes are polygonal in cross section.

6. An electric treater for treating oil continuous emulsions comprising a container, at least one set of spaced apart rod-shaped electrodes characterized as being irregularly shaped in cross section positioned within said container, a source of electrical current connected to said electrodes, an inlet for the oil continuous emulsion and an outlet for removing the treated oil.

7. An electric treater as claimed in claim 6 in which the electrodes are of polygonal cross section.

8. An electric treater as claimed in claim 6 where the source of electrical current is a unidirectional source.

9. An electric treater as claimed in claim 6 where the source of electrical current is an alternating source.

10. An electric treater as claimed in claim 7 where the container is a horizontally disposed tank and the rod-shaped electrodes lie in a horizontal plane.

11. In an electric treater for treating oil continuous emulsions, said treater including a container, a set of spaced, vertically disposed, substantially parallel planar corrugated electrodes, rows of non-planar electrodes extending vertically in the spaces between said planar corrugated electrodes substantially equidistant from each other and from said planar electrodes, a source of unidirectional potential connected to said electrodes, an inlet for said oil continuous emulsion below said electrodes, an outlet for the treated oil above said electrodes, and means for withdrawing a coalesced discontinuous phase from said container.

12. An electric treater as claimed in claim 11 in which the non-planar electrodes are of substantially irregular rod shaped cross section.

13. An electric treater as claimed in claim 12 where the irregular rod shaped non-planar electrodes are of polygonal cross section.

References Cited
UNITED STATES PATENTS

| | | | |
|---|---|---|---|
| 1,142,761 | 6/1915 | Laird et al. | 204—305 |
| 1,838,849 | 12/1931 | Lawrason | 204—304 XR |
| 2,025,674 | 12/1935 | Schweitzer | 204—289 |
| 2,654,438 | 10/1953 | Wintermute | 204—302 XR |

HOWARD S. WILLIAMS, Primary Examiner

D. R. VALENTINE, Assistant Examiner

U.S. Cl. X.R.

204—280, 289